United States Patent
Watanabe et al.

(10) Patent No.: US 6,274,646 B1
(45) Date of Patent: *Aug. 14, 2001

(54) INK COMPOSITION CAPABLE OF REALIZING PRINT WITH IMPROVED FIXATION

(75) Inventors: Kazuaki Watanabe; Kiyohiko Takemoto; Shuichi Yamaguchi; Naoki Tanaka, all of Suwa; Minoru Waki, Himeji; Naoki Okamoto, Himeji; Kazumi Adachi, Himeji, all of (JP)

(73) Assignee: Mikuni Color Ltd., Himeji (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/919,408

(22) Filed: Aug. 28, 1997

(30) Foreign Application Priority Data

Aug. 30, 1996 (JP) .................................................. 8-231074

(51) Int. Cl.⁷ ...................................................... C09D 11/10
(52) U.S. Cl. .............................. 523/161; 524/56; 524/58; 524/522; 524/523; 106/31.6; 106/31.47; 260/DIG. 38
(58) Field of Search ................... 523/161; 260/DIG. 38; 524/56, 58, 522, 523; 106/31.6, 31.47

(56) References Cited

U.S. PATENT DOCUMENTS

| 5,085,698 | 2/1992 | Ma et al. ................................. 106/20 |
| 5,690,723 | * 11/1997 | Sano et al. ........................... 106/31.75 |
| 5,821,283 | * 10/1998 | Hesler et al. ........................... 523/161 |

FOREIGN PATENT DOCUMENTS 4233732 4/1993 (DE) .

* cited by examiner

*Primary Examiner*—Terrel Morris
*Assistant Examiner*—John J. Guarriello
(74) *Attorney, Agent, or Firm*—Ladas & Parry

(57) ABSTRACT

An ink composition is provided which can realize printing with excellent fixation even on a coated paper having a smooth surface. Further, an ink composition is also provided which, when used in ink jet printing, causes neither clogging nor creation of a precipitate. A copolymer of butyl acrylate, methyl methacrylate, and acrylic acid is added to an ink composition.

20 Claims, No Drawings

INK COMPOSITION CAPABLE OF REALIZING PRINT WITH IMPROVED FIXATION

BACKGROUND OF THE INVENTION

1. Field of the Invention

The present invention relates to an ink composition containing a specific resin. More particularly, the present invention relates to an ink composition suitable for ink jet recording.

2. Background Art

Sure fixation of recording print onto a recording medium is an important property required of the ink composition. In recent years, coated papers and the like have been used as a recording medium. The surface of the recording medium has been rendered very smooth for imparting a feel of high grade. There is a demand for an ink composition which can yield a print having satisfactory abrasion resistance even on a recording medium having such a smooth surface.

Further, in recent years, ink jet recording has become used widely. In the method, droplets of an ink composition are ejected and deposited onto a recording medium such as paper. The ink jet recording method can realize high speed printing of an image having a high resolution and a high quality by means of a relatively inexpensive apparatus. The coated papers with a smoothed surface are extensively used as a recording medium from the viewpoint of adding a further value to the record. Therefore, for ink compositions for ink jet recording, realizing print with good fixation on such a recording medium is an important property to be required.

SUMMARY OF THE INVENTION

The present inventors have now found that addition of a specific resin to an ink composition can improve the fixation of print onto a recording medium. The present invention has been made based on such finding.

Thus, according to one aspect of the present invention, there is provided an ink composition comprising at least a pigment, a resin, an organic solvent, and water, wherein the resin is a copolymer comprising- units represented by the following formulae (I), (II), and (III):

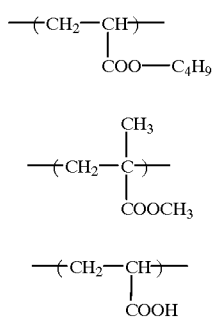

DETAILED DESCRIPTION OF THE INVENTION

The ink composition of the present invention is used for recording methods using an ink composition. The recording methods using an ink composition include, for example, ink jet recording, recording using writing implements, such as pens, and other various printing methods. In particular, the ink composition of the present invention is preferably used for ink jet recording.

The ink composition of the present invention can yield print with good fixation onto a recording medium. In particular, it can realize print with high fixation onto recording media with a very smooth layer provided on the surface thereof, such as coated papers.

An ink composition to be used in an ink jet recording method wherein the ink composition is ejected through very fine nozzles should meet property requirements including that it does not clog the fine nozzles and no precipitate is created around the nozzle. The ink composition of the present invention, even when used in ink jet recording, can offer an advantage that it is less likely to cause clogging and does not create any precipitate around the nozzles.

The ink composition of the present invention basically comprises a pigment, a resin, an organic solvent, and water. The resin contained in the ink composition of the present invention is a copolymer comprising units represented by the formulae (I), (II), and (III). In the formula (I), the butyl group located in the side chain is preferably n-butyl. This resin has an acid value of 50 to 100, preferably 50 to 70, and a molecular weight of 10,000 to 20,000, preferably 12,000 to 16,000. According to a preferred embodiment of the present invention, in this copolymer, the ratio of the unit represented by the formula (I) to the unit represented by the formula (II) to the unit represented by the formula (III) is preferably (15 to 30) (55 to 85): (5 to 15), more preferably (20 to 25): (60 to 75): (5 to 10). The acid value and the molecular weight are in the above respective ranges realize better fixation. Further, the ink composition containing the resin having an acid value and a molecular weight falling within the above respective ranges effectively prevent the clogging and the creation of a precipitate in ink jet recording. According to a preferred embodiment of the present invention, the copolymer is a random copolymer.

The copolymer may be produced, for example, by providing butyl acrylate, methyl methacrylate, and acrylic acid as monomers and copolymerizing the monomers by conventional suspension polymerization, continuous bulk polymerization, solution polymerization or other methods. More specifically, dissolution of the monomers in a solvent followed by heat polymerization in the presence of a polymerization initiator, such as azoisobutyronitrile, that is, radical polymerization, permits a contemplated product to be surely and simply produced.

Regarding the pigment added to the ink composition of the present invention, inorganic and organic pigments are usable without any particular limitation. Examples of the inorganic pigment include, in addition to titanium oxide and iron oxide, carbon blacks produced by known processes, such as contact, furnace, and thermal processes. Examples of the organic pigment include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

The amount of the pigment added to the ink is preferably about 0.5 to 25% by weight, more preferably about 2 to 15% by weight.

According to a preferred embodiment of the present invention, preferably, the pigment is added, to the ink, in the form of a pigment dispersion prepared by dispersing the pigment in an aqueous medium with the aid of a dispersant or a surfactant. Preferred dispersants usable herein include dispersants commonly used in the preparation of pigment dispersions, for example, polymeric dispersants.

Preferred examples of dispersant or surfactants usable herein include polyacrylic acid, polymethacrylic acid, acrylic acid/acrylonitrile copolymer, vinyl acetate/acrylic ester copolymer, acrylic acid/alkyl acrylate copolymer, styrene/acrylic acid copolymer, styrene/methacrylic acid copolymer, styrene/acrylic acid/alkyl acrylate copolymer, styrene/methacrylic acid/alkyl acrylate copolymer, styrene/α-methylstyrene/acrylic acid copolymer, styrene/α-methylstyrene/acrylic acid/alkyl acrylate copolymer, styrene/maleic acid copolymer, vinylnaphthalene/maleic acid copolymer, vinyl acetate/ethylene copolymer, vinyl acetate/fatty acid vinylethylene copolymer, vinyl acetate/maleic ester copolymer, vinyl acetate/crotonic acid copolymer, and vinyl acetate/acrylic acid copolymer.

According to a preferred embodiment of the present invention, the weight-average molecular weight of the copolymer is preferably about 3,000 to 50,000, more preferably about 5,000 to 30,000, most preferably about 7,000 to 15,000.

The amount of the dispersant added may be such that the pigment can be stably dispersed without sacrificing the other effects of the present invention. According to a preferred embodiment of the present invention, the amount of the dispersant added is preferably about 1:0.06 to 1:3, more preferably about 1:0.125 to 1:3, in terms of pigment to dispersant ratio.

Specific examples of organic solvents added to the ink composition of the present invention include high-boiling organic solvents. The high-boiling organic solvent serves to prevent the ink composition from being concentrated due to evaporation, thus preventing clogging of a recording head. Preferred examples of high-boiling organic solvents include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monomethyl ether, ethylene glycol monobutyl ether, diethylene glycol monomethyl ether, diethylene glycol monoethyl ether, diethylene glycol monobutyl ether, triethylene glycol monomethyl ether, and triethylene glycol monoethyl ether, and triethylene glycol monobutyl ether; urea, 2-pyrrolidone, N-methyl-2-pyrrolidone, 1,3-dimethyl-2-imidazolidinone, and triethanolamine.

Although the amount of the high-boiling organic solvent added is not particularly limited, it is preferably about 0.5 to 40% by weight, more preferably about 2 to 20% by weight.

The ink composition according to the present invention may contain a low-boiling organic solvent as an organic solvent. Preferred examples of low-boiling organic solvents usable herein include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink. The amount of the low-boiling organic solvent added is preferably in the range of from 0.5 to 10% by weight, more preferably in the range of from 1.5 to 6% by weight.

According to a preferred embodiment of the present invention, the ink composition of the present invention may comprise a penetrating agent. Penetrating agents usable herein include various surfactants such as anionic, cationic, and amphoteric surfactants; alcohols such as methanol, ethanol, and iso-propyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether.

According to a preferred embodiment of the present invention, the ink composition contains a saccharide. Examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, maltose, cellobiose, lactose, sucrose, trehalose, and maltotriose. The term "polysaccharide" used herein refers to saccharides, in a broad sense, including substances which widely exist in the natural world, such as alginic acid, α-cyclodextrin, and cellulose.

Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbitol.

The content of the above saccharide is suitably in the range of from 0.1 to 40% by weight, preferably 0.5 to 30% by weight, based on the ink.

Further, if necessary, pH adjustors, preservatives, antimolds and the like may be added to the ink composition according to the present invention.

EXAMPLES

The present invention will be described in more detail with reference to the following examples, though it is not limited to these examples only.

Preparation of Resin

An acrylic acid/butyl acrylate/methyl methacrylate copolymer was synthesized as follows. A solution of 280 g of methyl methacrylate, 88 g of butyl acrylate, 32 g of acrylic acid, 0.74 g of azobisisobutyronitrile, and 368 g of benzene was heat-polymerized at 60° C. for 6.5 hr with occasional shaking. The reaction product was dissolved in 3 L of methyl ethyl ketone and precipitated from a seven-fold amount of hexane to give a copolymer having a molecular weight of 12,000 to 16,000.

Ink Compositions

Ink compositions having respective compositions specified in the following table were prepared. In the table, percentages are by weight. A pigment and a dispersant were mixed together and dispersed by means of a sand mill (manufactured by Yasukawa Seisakusho) with glass beads (diameter: 1.7 mm, amount: 1.5 times the amount of the mixture) for 2 hr. After the glass beads were removed, the remaining ingredients were added. The mixture was stirred at room temperature for 20 min and then filtered through a 5-μm membrane filter to prepare ink compositions.

TABLE 1

|  | Example 1 Black | Example 2 Black | Example 3 Black | Example 4 Cyan | Example 5 Magenta | Example 6 Yellow | Comparative Example 1 Black | Comparative Example 2 Cyan |
|---|---|---|---|---|---|---|---|---|
| Pigment | 2.5% | 2.5% | 2.5% | 2.5% | 2.5% | 2.5% | 2.5% | 2.5% |
| Resin | 1.2% | 1.5% | 3.0% | 1.2% | 1.2% | 1.2% | — | — |
| Dispersant | 1.0% | 1.0% | 1.0% | 1.0% | 1.0% | 1.0% | 1.0% | 1.5% |
| Emulsion | 1.5% | 1.5% | 1.5% | 1.5% | 1.5% | 1.5% | 1.5% | 1.5% |
| Maltitol | 6.3% | 6.3% | 6.3% | 6.3% | 6.3% | 6.3% | 6.3% | 6.3% |
| Sucrose | 0.7% | 0.7% | 0.7% | 0.7% | 0.7% | 0.7% | 0.7% | 0.7% |
| Glycerin | 10.0% | 10.0% | 10.0% | 13.5% | 12.0% | 9.0% | 10.0% | 13.5% |
| 2-Pyrrolidone | 2.0% | 2.0% | 2.0% | 2.0% | 2.0% | 2.0% | 2.0% | 2.0% |
| Triethanolamine | 0.9% | 0.9% | 0.9% | 0.9% | 0.9% | 0.9% | 0.9% | 0.9% |
| KOH | 0.1% | 0.1% | 0.1% | 0.1% | 0.1% | 0.1% | 0.1% | 0.1% |
| Hitenol | 0.8% | 0.8% | 0.8% | 0.8% | 0.8% | 0.8% | 0.8% | 0.8% |
| Pure water | Balance | Balance | Balance | Balance | Balance | Balance | Balance | Balance |

In the table, the resin refers to the acrylic acid/butyl acrylate/methyl methacrylate copolymer. A styrene/acrylic acid copolymer was used as the dispersant, and Voncoat 4001 manufactured by Dainippon Ink and Chemicals, Inc. (acrylic resin emulsion, resin component=50%, MFT=5%) was used as the resin emulsion. Hitenol is a surfactant Hitenol No. 7 manufactured by Dai-ichi Kogyo Seiyaku, Co., Ltd.

In the table, pigments and resins used were as follows.

Examples 1 to 3

(Black Ink)
Carbon black MA7 (manufactured by Mitsubishi Kasei Corp.)

Example 4

(Cyan Ink)
KET BLUE EX-1 (manufactured by Dainippon Ink and Chemicals, Inc.)

Example 5

(Magenta Ink)
KET RED 309 (manufactured by Dainippon Ink and Chemicals, Inc.)

Example 6

(Yellow Ink)
KET YELLOW 403 (manufactured by Dainippon Ink and Chemicals, Inc.)

Evaluation Test

Ink compositions prepared in Examples 1 to 6 and Comparative Examples 1 and 2 were evaluated as follows.

Evaluation 1:

Fixability The ink composition was printed on a specialty gloss film for ink jet printing by means of an ink jet printer MJ-510C (manufactured by Seiko Epson Corp.). The print was 30 then air dried for 24 hr.

(1) Line Marker Resistance

The print was rubbed with a water-base yellow highlighter marker (ZEBRA PEN 2, manufactured by ZEBRA) at a marking force of $4.9 \times 10^5$ N/m$^2$, and the degree of stain of the print was observed. The results were evaluated based on the following criteria.

No stain created with once stroke A

Stain created by once stroke: NG

The results were as tabulated in the following table.

(2) Pressure-sensitive Adhesive Tape Test

A pressure-sensitive adhesive tape (cellophane tape: Sekisui Tape, manufactured by Sekisui Chemical Co., Ltd.) was applied to the printed area in the prints, rubbed twice or thrice with a finger, and then peeled off. The printed area from which the pressure-sensitive adhesive tape has been peeled off was visually inspected. The results were evaluated based on the following criteria:

Ink (colorant) not separated from the surface of the specialty gloss film: A

Ink present in both the surface of the specialty gloss film and the surface of a pressure-sensitive adhesive in the pressure-sensitive adhesive tape: NG The results were as tabulated in the following table.

Evaluation 2:

Clogging Property

A head of an ink jet printer MJ-510C was filled with an ink composition, and alphanumeric characters were continuously printed for 10 min. The printer was stopped and allowed to stand without capping under an environment of 40° C. and 25% Rh for two weeks or one month. Thereafter, the printing of alphanumeric characters was resumed. The number of cleaning operations necessary for providing prints having a quality equal to the prints before standing was determined.

The results were evaluated according to the following criteria.

0 to 2 repeated cleaning operations were necessary for providing prints having a quality equal to the prints before standing: A More than 3 repeated cleaning operations were necessary for providing prints having a quality equal to the prints before standing: NG The results were as tabulated in the following table.

TABLE 2

|  | Evaluation 1 (fixability) | | Evaluation 2 (clogging property) | |
|---|---|---|---|---|
|  | Line marking resistance | Pressure-sensitive adhesive tape test | 2 weeks | 1 month |
| Example 1 | A | A | A | A |
| Example 2 | A | A | A | A |
| Example 3 | A | A | A | A |
| Example 4 | A | A | A | A |

TABLE 2-continued

| | Evaluation 1 (fixability) | | Evaluation 2 (clogging property) | |
|---|---|---|---|---|
| | Line marking resistance | Pressure-sensitive adhesive tape test | 2 weeks | 1 month |
| Example 5 | A | A | A | A |
| Example 6 | A | A | A | A |
| Comparative Example 1 | NG | NG | A | A |
| Comparative Example 2 | NG | NG | A | A |

What is claimed is:

1. An ink composition comprising a resin and other components including a pigment an organic solvent, and water,
wherein the resin is a copolymer comprising units represented by the following formulae (I), (II), and (III):

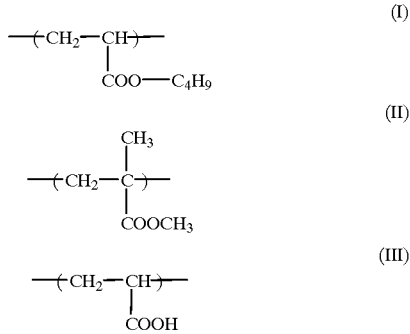

said composition being prepared by a method comprising admixing the resin with the other components in a manner and in an amount that enhances a fixation property of a print formed by the Ink composition, wherein the copolymer has an acid value of 50 to 100 and a weight average molecular weight of 10,000 to 20,000.

2. The ink composition according to claim 1, wherein the copolymer is a random copolymer.

3. The ink composition according to claim 1, wherein the copolymer comprises the unit represented by the formula (I), the unit represented by the formula (II), and the unit represented by the formula (III) in a ratio of (15 to 30): (55 to 85): (5 to 15).

4. The ink composition according to claim 1, which further comprises a saccharide.

5. The ink composition according to claim 1, which further comprises a surfactant.

6. A recording method comprising depositing an ink composition onto a recording medium to form print thereon, the ink composition being one according to claim 1.

7. The recording medium with print thereon formed by the recording method of claim 6.

8. The ink composition according to claim 1, wherein the ink composition further comprises a dispersant in an amount sufficient stably to disperse the pigment in the ink composition, said method comprising preparing a pigment dispersion by dispersing the pigment with the dispersant prior to admixing the resin therewith.

9. The ink composition according to claim 8, wherein the pigment is dispersed with the dispersant by milling and wherein the resin is admixed with the other components by stirring.

10. The ink composition according to claim 8, further comprising a saccharaide in an amount of from about 0.1 to 40% by weight.

11. The ink composition according to claim 8, wherein the resin and other components are selected and are present in the ink composition in respective amounts such that the ink composition is ejectable through an ink jet nozzle without clogging the nozzle.

12. A recording method comprising depositing droplets of the ink composition of claim 11 onto a recording medium to form print thereon.

13. The recording medium with print thereon formed by the recording method according to claim 12.

14. The ink composition according to claim 1, wherein the resin and other components are selected and are present in the ink composition in respective amounts such that the ink composition is ejectable through an ink jet nozzle without clogging the nozzle.

15. An ink jet recording method comprising ejecting and depositing droplets of an ink composition onto a recording medium to form print thereon, the ink composition being one according to claim 1.

16. The ink composition according to claim 1, wherein the copolymer has an acid value and molecular weight that effectively prevent the ink composition from clogging or creating a precipitate in an ink jet nozzle during ink jet printing with the ink composition.

17. The ink composition of claim 1, wherein the copolymer consists essentially of the units represented by the formulae (I), (II) and (III).

18. An ink composition comprising a resin, a pigment, an organic solvent, and water,
wherein the resin is a copolymer comprising units represented by the following formulae (I), (II), and (III):

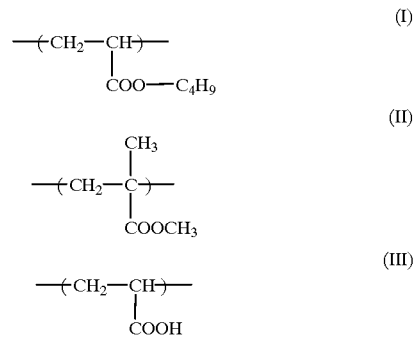

wherein the resin is not substantially absorbed on a surface of the pigment and is added to effectively enhance a fixation property of a print formed by the ink compositions and wherein the copolymer has an acid value of 50 to 100 and a weight average molecular weight of 10,000 to 20,000.

19. The ink composition according to claim 18, wherein the copolymer comprises the unit represented by the formula (I), the unit represented by the formula (II), and the unit represented by the formula (III) in a ratio of (15 to 30):(55 to 85):(5 to 15).

20. The ink composition of claim 18, wherein the copolymer consists essentially of the units represented by the formulae (I), (II) and (III).

* * * * *

UNITED STATES PATENT AND TRADEMARK OFFICE
CERTIFICATE OF CORRECTION

PATENT NO. : 6,274,646 B1
DATED : August 14, 2001
INVENTOR(S) : Kazuaki Watanabe et al.

It is certified that error appears in the above-identified patent and that said Letters Patent is hereby corrected as shown below:

<u>Title page,</u>
Item [73], before "Mikuni" insert -- Seiko Epson Corporation, Tokyo-to (JP) and --

Signed and Sealed this

Twentieth Day of August, 2002

Attest:

JAMES E. ROGAN
*Attesting Officer*   *Director of the United States Patent and Trademark Office*